Patented June 6, 1950

2,510,849

UNITED STATES PATENT OFFICE 2,510,849

METHOD OF STABILIZING AROMATIC AMINES

John C. Zimmer, Union, and Arnold J. Morway, Rahway, N. J., assignors to Standard Oil Development Company, a corporation of Delaware No Drawing. Application April 26, 1946, Serial No. 665,343

3 Claims. (Cl. 260—578)

This invention relates to the stabilization of aromatic amines against deterioration, etc., during storage.

Aromatic amines such as aniline, toluidine, xylidine, etc., are normally substantially colorless when freshly prepared or freshly distilled, but tend to darken in color during storage, the undesirable results being greatly accelerated by storage at elevated temperatures.

The object of the present invention is to stabilize such aromatic amines against discoloration during storage.

Broadly, the present invention comprises adding to such aromatic amines, or to a hydrocarbon liquid such as a gasoline motor fuel basestock or a mineral lubricating oil, containing same, a small amount of a stabilizer comprising essentially a phosphorus sulfide reaction product of a phenolic compound or derivative having the general formula $$R_nC_6H_{5-n}OY$$

in which $R_n$ represents alkyl groups of 1 to 10 carbon atoms preferably 1 to 5 carbon atoms, $n$ is a number from 0 to 4, preferably 1 to 3, and Y is either hydrogen or a hydrocarbon of 1 to 10 carbon atoms, preferably an alkyl group of 1 to 5 carbon atoms.

In making this reaction product, various phosphorus sulfides may be used such as $P_2S_3$, $P_2S_5$, $P_4S_3$, etc., although $P_2S_5$ is preferred.

The phenolic compound to be reacted with such phosphorus sulfides, may be selected from a wide variety of phenols, cresols, xylenols and other alkylated phenols such as tertiary-butyl phenol, di-tertiary-butyl phenol, 2-tertiary-butyl 4-methyl phenol, 2,6-di-tertiary-butyl 4-methyl phenol, etc., as well as mixtures thereof or ether thereof in which the phenolic hydrogen atom is replaced by a lower alkyl group such as methyl, ethyl, isopropyl, tertiary-butyl, phenyl, etc.

In carrying out the invention, the phosphosulfide-phenolic reaction product which is the stabilizer of this invention, is prepared by heating the phenolic material with the phosphorus sulfide, generally using a reaction temperature of about 150 to 200° C. The proportions of reactants may vary somewhat according to the individual materials used, but normally will range from about 10 to 100 parts by weight of phenolic material to each 1 part by weight of the phosphorus sulfide. If desired, the reaction may be carried out in the presence of an inert solvent.

Although the invention is intended to apply broadly to the stabilization of any type of aromatic amines, it is believed particularly applicable to alkaryl amines, especially those having from 1 to 3 alkyl carbon atoms. The invention has been found very successful for the stabilization of xylidine, either the pure separate isomers, or mixtures thereof. Other alkaryl amines which may be stabilized include the toluidines, ortho, meta or para, or mixtures thereof, the several ethyl anilines, cumidine (which is isopropyl aniline), etc. Dialkylated and trialkylated aryl amines are preferred. Although the invention is particularly applicable to such alkaryl amines, it may also be used for stabilizing aniline, naphthylamines, and the various derivatives of aniline in which either or both of the hydrogens of the amino group are substituted by hydrocarbons, i. e., either alkyl or aryl groups, e. g., in N-monomethyl aniline, N-dimethyl aniline, N-monoethyl aniline, etc. Thus although the invention is particularly applicable to alkaryl primary amines, other amines such as secondary and tertiary amines may also be used.

Although the amount of the stabilizer to be used may vary according to the intended duration of storage and the temperature of storage, as well as according to the particular aromatic amine and the particular stabilizer used, in general about .01% to 1.0% of stabilizer will be sufficient, and usually about .05% to 0.5% by weight of stabilizer will be found most practical for giving satisfactory results.

The various above described aromatic amines may be used alone, for example, as a dye intermediate where color is particularly objectionable, or together with a diluent such as a hydrocarbon solvent, e. g. naphtha or gasoline for use as motor fuel. It may also be diluted with alcohols, ethers or other organic solvents to form mixtures suitable for de-icing and knock suppression in aircraft engines. Such diluents may be present in amounts ranging from only a few per cent up to 10, 20 or even 100 times the volume of the aromatic amine.

In carrying out the invention, it is preferred to add the stabilizer to the aromatic amine as soon as the latter has been prepared, or immediately after distillation, preferably carried out under an inert atmosphere so that a water white distillate is obtained for inhibition. This latter condition, however, is not essential to the operation of the invention.

If the aromatic amines to be stabilized is intended to be used in a motor fuel such as a high octane aviation motor fuel, suitable proportions for the final blend may for example comprise a motor fuel basestock of at least 90–95% and consisting essentially of hydrocarbons of the motor fuel boiling range alone or together with a minor amount such as 1 to 30% or so of an oxygen-containing hydrocarbon derivative such as methyl, ethyl, isopropyl, or tertiary-butyl alcohol, diisopropyl ether, acetone, methyl ethyl ketone, etc., together with about 0.1 to 5%, preferably about 0.5 to 3%, of an aromatic amine antiknock agent such as toluidine, xylidine, cumidine, etc., and together with a still further smaller amount of the color stabilizer of this invention, a suitable concentration being about 0.001% to .05% by weight of the total blended fuel. Small amounts of other motor fuel additives may be used if desired such as 0.1 to 6 cc. of a lead alkyl anti-knock agent such as tetra ethyl lead, per gallon of fuel as well as small amounts of suitable oxidation inhibitors to prevent gum formation in the motor fuel basestock.

The following experimental data will illustrate the advantages of the invention:

Phosphorus pentasulfide $P_2S_5$ was reacted with three different phenolic materials, and the resulting reaction products referred to as new products A, B, and C, respectively were tested as color stabilizers for xylidine in naphtha solutions.

New product A was made by heating about 5 parts by weight of $P_2S_5$ with about 95 parts by weight of a material considered to be a 2,6-di-tertiary-butyl 4-methyl phenol, which is a reaction product of paracresol with isobutylene in the presence of sulfuric acid at 70° C. The reaction was carried out by heating the phenolic material to 93° C. where the phenolic material is liquefied, adding the $P_2S_5$ to the melted liquid material and raising the heat to about 182° C. for about 30 minutes. The reacted product is then allowed to cool to 300° F. and filtered hot to remove any unreacted phosphorus sulfides. The product showed on analysis: 1.38% P and 1.91% S.

New product B was made by reacting about 5 parts by weight of $P_2S_5$ with about 95 parts by weight of a material understood to be a tertiary-butyl derivative of mixed cresols. This reaction was carried out similar to that used to make prodduct A except that no precipitation of unreacted $P_2S_5$ was noted in cooling.

New product C was made by reacting 5 parts by weight of $P_2S_5$ with 95 parts by weight of a mixture of ortho, meta, and paracresols, as commercially available on the market. This reaction was carried out the same as for product A.

Each of the above three materials identified as product A, B, and C were blended in 0.2% concentration (by weight) in xylidine. For comparison a sample of the xylidine without any stabilizer, was prepared. All 4 blends were then subjected to optical density observations before and after storage for various numbers of hours at a temperature of 194° F. Discoloration is shown by an increase in optical density. The results of the test were as follows:

| Stabilizer Used in 0.2% Conc. | Optical Density of Inhibited Xylidine (referred to Water) after storage at 194° F. for following number of Hours | | | | | |
|---|---|---|---|---|---|---|
| | 0 | 4-5 | 8 | 24 | 28 | 46-47 |
| None | 0.01 | 0.24 | 0.49 | 1.2 | | 2.0 |
| A | 0.01 | 0.01 | 0.01 | 0.03 | 0.05 | 0.40 |
| B | 0.01 | 0.03 | | 0.21 | | 1.29 |
| C | 0.02 | 0.03 | | 0.47 | | 1.8 |

The above data show that the xylidine solution without any stabilizer in it became discolored to an optical density of 1.0 after about 20 hours of storage; this represents a rapid discoloration. The data also show that the new products A, B, and C all effect a very great reduction in the discoloration of the xylidine solution, since with product A the optical density shows only 0.4 even after 46 hours of storage and products B and C gave optical densities below 0.5 after 24 hours of storage. These are remarkably good results and indicate that the reaction of $P_2S_5$ with the phenolic materials in making products A, B, and C, has unexpectedly stabilized the xylidine against discoloration during storage. The outstandingly best results were obtained with the reaction product of $P_2S_5$ with the di-tertiary-butyl paracresol, believed to be a 2,6-di-tertiary-butyl 4-methyl phenol.

Higher percentages of $P_2S_5$ such as 10% $P_2S_5$ may be reacted with any of the above phenolic materials, however considerable separation of unreacted $P_2S_5$ occurs in cooling. To prevent this separation, the following method was employed.

The phenolic material was heated to 200° F. in a closed flask fitted with a condenser. 5% sulfur was added while stirring and the temperature raised to 350° F. and held for 1½ hours. 10% $P_2S_5$ was then added to the material in the flask and the temperature raised to 375-400° F. and maintained for 2 hours. No separation of unreacted material took place. The product showed: 8.54% S and 2.84% P.

It is not intended that this invention be limited to the specific materials which have been given merely for the sake of illustration, but only by the appended claims in which it is intended to claim all novelty inherent in the invention as well as all modifications coming within the scope and spirit of the invention.

What we claim is:

1. A composition comprising a stabilized aromatic amine which consists essentially of an aromatic amine having added thereto about .05 to 0.5% by weight of the reaction product of $P_2S_5$ with a polyalkyl phenol, said reaction product containing both phosphorus and sulfur.

2. Xylidene stabilized against discloration during storage by having added thereto about .05 to 0.5% by weight of the reaction product of $P_2S_5$ with 2,6-di-tert-butyl-4-methyl phenol, said reaction product containing phosphorus and sulfur.

3. The method of stabilizing an aromatic amine against discoloration during storage, which comprises adding to the amine about .05 to 0.5% by weight of the reaction product of $P_2S_5$ with polyalkyl phenols having alkyl groups at the 2, 4 and 6 positions, said reaction products containing both phosphorus and sulfur.

JOHN C. ZIMMER.
ARNOLD J. MORWAY.

REFERENCES CITED

The following references are of record in the file of this patent:

UNITED STATES PATENTS

| Number | Name | Date |
|---|---|---|
| 1,917,073 | Stewart | July 4, 1933 |
| 1,947,578 | Bond | Feb. 20, 1934 |
| 1,961,097 | Cunningham | May 29, 1934 |
| 2,348,290 | Gilbert | May 9, 1944 |
| 2,422,484 | Herbst | June 17, 1947 |
| 2,434,650 | Herbst | Jan. 20, 1948 |
| 2,442,457 | Chenicek | June 1, 1948 |

OTHER REFERENCES

Richter, "The Chemistry of the Carbon Compounds (Elsevier Publishing Co., New York, 1946), vol. III, page 213.